United States Patent [19]  
Wiest et al.

[11] 4,073,779  
[45] Feb. 14, 1978

[54] HYDROLYSIS-RESISTANT, FILM-FORMING COPOLYMER DISPERSIONS

[75] Inventors: Hubert Wiest; Rainer Berger; Erwin Lieb, all of Burghausen, Germany

[73] Assignee: Wacker-Chemie GmbH, Munich, Germany

[21] Appl. No.: 713,420

[22] Filed: Aug. 11, 1976

[30] Foreign Application Priority Data

Sept. 19, 1975 Germany .................. 2541934

[51] Int. Cl.$^2$ .................. C08F 210/02; C08L 23/08
[52] U.S. Cl. .................. 260/79.3 MU; 260/29.6 T; 260/29.6 TA; 526/258; 526/264; 526/303; 526/304; 526/317; 526/318; 526/329; 526/331
[58] Field of Search .............. 526/329, 331, 258, 264, 526/303, 304, 317, 318; 260/29.6 T, 29.6 TA, 79.3 MU

[56] References Cited

U.S. PATENT DOCUMENTS

| | | | |
|---|---|---|---|
| 2,342,400 | 2/1944 | Hopff et al. | 526/329 |
| 3,487,036 | 12/1969 | Bissot | 260/29.6 TA |
| 3,632,542 | 1/1972 | Fox et al. | 260/29.6 T |
| 3,639,326 | 2/1972 | Kray et al. | 526/329 |
| 3,692,723 | 9/1972 | Kasagi et al. | 260/29.6 TA |
| 3,755,237 | 8/1973 | Isaacs et al. | 526/331 |
| 3,779,992 | 12/1973 | Liu et al. | 526/329 |
| 3,816,363 | 6/1974 | Wicht et al. | 260/29.6 TA |
| 3,817,896 | 6/1974 | Bergmeister et al. | 260/29.6 TA |
| 3,830,761 | 8/1974 | Lenney | 260/29.6 T |
| 3,929,706 | 12/1975 | Schmidt et al. | 260/29.6 T |

*Primary Examiner*—Harry Wong, Jr.
*Attorney, Agent, or Firm*—Hammond & Littell

[57] ABSTRACT

A hydrolysis-resistant, film-forming, aqueous dispersion of a copolymer consisting essentially of
  (a) from 5% to 50% by weight of ethylene units,
  (b) from 10% to 60% by weight of vinyl alkanoate units having from 1 to 14 carbon atoms in the alkanoate moiety,
  (c) from 20% to 70% by weight of vinyl chloride units, and
  (d) from 5% to 30% by weight of alkyl methylacrylate units having from 1 to 8 carbon atoms in the alkyl moiety; as well as the hydrolysis-resistant films produced on drying the above aqueous dispersion having a hydrolysis resistance in a 5 × 5 cm film having a thickness of 0.1 ± 0.02 mm, such that after storage for four days in a 25% aqueous sodium hydroxide solution, its weight loss is less than 10%.

10 Claims, No Drawings

HYDROLYSIS-RESISTANT, FILM-FORMING COPOLYMER DISPERSIONS

RELATED ART

An aqueous dispersion of a copolymer of a vinyl ester, especially vinyl acetate, and up to 40% by weight of ethylene may be used for the manufacture of films, coatings and paint. The dispersions generally have a good compatibility with pigments and the films produced therefrom generally have a good flexibility and a good adhesiveness. Paints produced from these dispersions can, however, have a low resistance to chalking, and the films may whiten and soften on storage in water and may not have a very good resistance to hydrolysis. Moreover, the surfaces of the films may be tacky.

Various methods of improving these properties have been suggested. The resistance to hydrolysis can be improved and the water-absorption can be decreased, for example, by increasing the ethylene content of the copolymer, but this tends to have an adverse effect on the compatibility of the dispersion with pigments and on the adhesiveness of the films and, moreover, the films tend to be quite soft and soil rapidly.

Aqueous dispersions of ethylene/vinyl ester/vinyl chloride copolymers are described in British Pat. Specifications Nos. 1,162,575 and 1,307,890. Films produced from these dispersions have a better resistance to hydrolysis and a lower water-absorption, although the latter is still quite high. The surfaces of these films are still tacky, however, and the films tend to yellow.

Aqueous dispersions of ethylene/vinyl ester/methyl methacrylate copolymers are described in British Pat. Specification No. 1,373,488. Films produced from these dispersions also have an improved resistance to hydrolysis, but their water-absorption is high and their resistance to chalking is poor. Moreover, the manufacture of these dispersions can involve problems, since the rate of polymerization falls with increasing methyl methacrylate content. In the manufacture of dispersions having a methyl methacrylate content in the copolymer of more than 15% by weight, polymerization is so slow and incomplete that such dispersions are of little industrial importance.

OBJECTS OF THE INVENTION

An object of the present invention is the development of aqueous dispersions of ethylene/vinyl ester copolymers which avoid the above drawbacks and are suitable for the manufacture of films, coatings and paint.

Another object of the present invention is the development of a hydrolysis-resistant film having a hydrolysis resistance measured in a 5 × 5 cm film having a thickness of 0.1 ± 0.02 mm, such that after maintaining for four days in a 25% aqueous sodium hydroxide solution, the weight loss of said film is less than 10%, consisting essentially of a dried film of an emulsion polymerized copolymer of a mixture of
  (a) from 5% to 50% by weight of ethylene units,
  (b) from 10% to 60% by weight of vinyl alkanoate units having from 1 to 14 carbon atoms in the alkanoate moiety,
  (c) from 20% to 70% by weight of vinyl chloride units,
  (d) from 5% to 30% by weight of alkyl methacrylate units having from 1 to 8 carbon atoms in the alkyl moiety,
  (e) from 0 to 5% by weight of olefinically unsaturated monomer units copolymerizable with components (a) to (d) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinylsulfonic acid, vinyl-pyrrolidone and N-vinylmethylacetamide, and
  (f) from 0 to 2% by weight of poly-olefinically-unsaturated monomer units copolymerizable with components (a) to (e).

A further object of the present invention is the development of a film-forming aqueous dispersion containing at least 40% by weight of water and a dispersed copolymer consisting essentially of
  (a) from 5% to 50% by weight of ethylene units,
  (b) from 10% to 60% by weight of vinyl alkanoate units having from 1 to 14 carbon atoms in the alkanoate moiety,
  (c) from 20% to 70% by weight of vinyl chloride units,
  (d) from 5% to 30% by weight of alkyl methacrylate units having from 1 to 8 carbon atoms in the alkyl moiety,
  (e) from 0 to 5% by weight of olefinically unsaturated monomer units copolymerizable with components (a) to (d) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinylsulfonic acid, vinyl-pyrrolidone and N-vinylmethylacetamide, and
  (f) from 0 to 2% by weight of poly-olefinically-unsaturated monomer units copolymerizable with components (a) to (e),
said dispersion forming a hydrolysis-resistant film.

A still further object of the present invention is the development of a process for the production of the above aqueous dispersion by aqueous emulsion polymerization.

These and other objects of the present invention will become more apparent as the description thereof proceeds.

DESCRIPTION OF THE INVENTION

The above objects have been achieved and the drawbacks of the prior art have been overcome by the development of a film-forming, aqueous polymer dispersion based on poly-ethylene/vinyl acetate/vinyl chloride, forming a film having a hydrolysis resistance measured on a 5 × 5 cm film having a thickness of 0.1 ± 0.02 mm, such that after maintaining for four days in a 25% aqueous sodium hydroxide solution, the weight loss of said film is less than 10%, comprising a copolymer of
  (a) from 5% to 50% by weight of ethylene units,
  (b) from 10% to 60% by weight of units of a vinyl ester of a saturated carboxylic acid,
  (c) from 20% to 70% by weight of vinyl chloride units, and
  (d) from 5% to 30% by weight of units of an ester of methacrylic acid with a saturated monohydric alcohol having up to 8 carbon atoms.

More particularly, the present invention relates to a hydrolysis-resistant film having a hydrolysis resistance measured in a 5 × 5 cm film having a thickness of 0.1 ± 0.02 mm, such that after maintaining for four days in 25% aqueous sodium hydroxide solution, the weight loss of said film is less than 10%, consisting essentially of a dried film of an emulsion polymerized copolymer of a mixture of (a) from 5% to 50% by weight of ethylene units,
(b) from 10% to 60% by weight of vinyl alkanoate units having from 1 to 14 carbon atoms in the alkanoate moiety,
(c) from 20% to 70% by weight of vinyl chloride units,
(d) from 5% to 30% by weight of alkyl methacrylate units having from 1 to 8 carbon atoms in the alkyl moiety,
(e) from 0 to 5% by weight of olefinically unsaturated monomer units copolymerizable with components (a) to (d) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinylsulfonic acid, vinyl-pyrrolidone and N-vinylmethyl-acetamide, and
(f) from 0 to 2% by weight of poly-olefinically-unsaturated monomer units copolymerizable with components (a) to (e).

In addition, the present invention relates to a film-forming aqueous dispersion containing at least 40% by weight of water and a dispersed copolymer dispersion consisting essentially of (a) from 5% to 50% by weight of ethylene units,
(b) from 10% to 60% by weight of vinyl alkanoate units having from 1 to 14 carbon atoms in the alkanoate moiety,
(c) from 20% to 70% by weight of vinyl chloride units,
(d) from 5% to 30% by weight of alkyl methacrylate units having from 1 to 8 carbon atoms in the alkyl moiety,
(e) from 0 to 5% by weight of olefinically unsaturated monomer units copolymerizable with components (a) to (d) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinylsulfonic acid, vinyl-pyrrolidone and N-vinylmethyl-acetamide, and
(f) from 0 to 2% by weight of poly-olefinically-unsaturated monomer units copolymerizable with components (a) to (e), said dispersion forming a hydrolysis-resistant film; as well as the process of producing said aqueous dispersion, which comprises copolymerizing components (a) to (f) specified above in an aqueous emulsion in the presence of a water-soluble, free-radical initiator and in the presence of an emulsifier and/or a protective colloid.

This polymerization process can be carried out at a relatively high rate and with a high degree of reaction, which was surprising in view of the unfavorable copolymerization parameters of vinyl chloride, vinyl esters and ethylene with respect to methacrylates.

Furthermore, films produced from the dispersions according to the invention are flexible and have an improved resistance to hydrolysis to water absorption and to weathering. Typically, a 5 × 5 cm film having a thickness of 0.1 ± 0.02 mm has a hydrolysis resistance such that after storage for four days in a 25% aqueous sodium hydroxide solution, its weight loss is less than 10%. The surfaces of the films are not appreciably tacky and thus are not susceptible to a high degree of soiling.

A preferred composition of the copolymer of the dispersion according to the invention comprises (a) from 5% to 30%, especially from 8% to 20%, by weight of ethylene units,
(b) from 10% to 60%, especially from 15% to 40%, by weight of the vinyl ester units,
(c) from 25% to 60%, especially from 40% to 60%, by weight of vinyl chloride units, and
(d) from 8% to 20% by weight of the methacrylate units.

The vinyl ester used for component (b) may be a vinyl ester of a straight-chain or branched-chain saturated carboxylic acid, the alkanoic acid advantageously having from 1 to 14 carbon atoms, preferably from 2 to 10 carbon atoms. Examples of such esters are vinyl acetate, vinyl propionate, vinyl butyrate, vinyl pivalate, vinyl 2-ethylhexanoate, vinyl isononanoate, vinyl laurate, and the vinyl ester of "Versatic Acid" (Trademark). It is preferred to use vinyl acetate and, optionally, vinyl propionate, or to use a mixture of from 10% to 90%, especially from 50% to 80%, by weight of a vinyl ester of an alkanoic acid having 2 or 3 carbon atoms and from 90% to 10%, especially from 50% to 20%, by weight of a vinyl ester of an alkanoic acid having from 8 to 12 carbon atoms.

The methacrylate ester is preferably one of a saturated monohydric alcohol or alkanol having from 1 to 8, preferably from 1 to 4, carbon atoms, for example, ethyl methacrylate, butyl methacrylate or, especially, methyl methacrylate, or their mixtures.

In addition to the components (a) to (d), the copolymer may comprise from 0 to 5%, preferably from 0.5% to 5%, by weight, based on the total monomers, of units of another water-soluble mono-olefinically unsaturated compound, for example, a monocarboxylic acid, for example, alkenoic acids having from 3 to 8 carbon atoms such as acrylic acid, methacrylic acid or crotonic acid; an amide of such an acid; a corresponding N-methylol compound; a dicarboxylic acid, for example, alkenedioic acids having from 4 to 8 carbon atoms, such as maleic acid, fumeric acid or itaconic acid; a monoester of such an acid with an alkanol having from 1 to 8 carbon atoms; a salt of vinylsulfonic acid; vinyl-pyrrolidone, or N-vinylmethyl-acetamide.

The copolymer may also comprise up to 2% by weight of units of a multiply-olefinically unsaturated compound, for example, triallyl cyanurate, diallyl adipate, vinyl crotonate, ethylene glycol di(meth)acrylate, butanediol di(meth)acrylate or allyl (meth)acrylate.

The ethylene content of the copolymer may be determined by suitably controlling the polymerization pressure. This pressure is advantageously from 15 to 300, preferably from 20 to 100, atmospheres gauge, and may be kept constant or altered during polymerization.

The water-soluble free-radical initiator used for the polymerization may be one of the type conventionally used for emulsion polymerization and is preferably a peroxidic compound, for example, hydrogen peroxide, sodium persulfate, potassium persulfate, ammonium persulfate or tert.-butyl hydroperoxide. An example of another suitable initiator is azo-bis(2-amidinopropane) hydrochloride. The peroxidic compounds may be used alone but are preferably used in conjunctiom with reducing agents, as redox catalyst systems. Examples of suitable reducing agents are sodium formaldehyde sulfoxylate, iron-II salts, sodium dithionite, sodium bisulfite, sodium sulfite, sodium thiosulfate and amines.

The redox catalyst systems described in British Pat. Specification No. 989,539 and U.S. Pat. No. 3,563,963 are also suitable for use in the present process.

British Pat. Specification No. 989,539 claims a process for the manufacture of polymers or copolymers of olefinically unsaturated organic compounds in aqueous dispersion with the use of a redox system, wherein the redox system used comprises an inorganic or organic per-compound and as reducing agent hydrogen and/or a compound that splits off hydrogen and the reaction is carried out in the presence of a colloidally dispersed noble metal of Group VIII of the Periodic Table.

U.S. Pat. No. 3,563,963 claims a process for the production of copolymers of mono-olefins having 2 to 6 carbon atoms and at least one other monomer polymerizable by a free radical mechanism, in aqueous dispersion using a catalyst system comprising:

(1) an organic or inorganic peroxy-compound,
(2) hydrogen or a compound that splits off hydrogen, and
(3) a colloidally distributed noble metal of Group VIII of the Periodic System, wherein the colloidally distributed noble metal is used in an amount within the range of from 0.000001% to 0.01% by weight calculated on the monomers and the system additionally contains
(4) ions of one or more of the metals iron, copper, nickel, cobalt, chromium, molybdenum, vanadium or cerium in an amount within the range of from 0.1 to 10 gram atom per gram atom of noble metal, the proportion by weight of the metal ions not exceeding 0.001% by weight calculated on the amount of monomers and the polymerization being carried out at a temperature within the range of from −50° C to +50° C.

The initiator may be used in customary amounts and is advantageously used in an amount within the range of from 0.001% to 2% by weight, based on the total monomers. The initiator may be wholly or partially present at the beginning of the polymerization. It is preferred that one or both components be metered in during polymerization.

The dispersant used in the polymerization process may be an emulsifier and/or a protective colloid as customarily used in emulsion polymerization. Either may be used alone or the two may be used together. The total amount of emulsifier and/or protective colloid used is suitably from 0.5% to 6% by weight, based on the total monomers.

Examples of suitable protective colloids are polyvinyl alcohol, partially acetylated polyvinyl alcohols, water-soluble cellulose derivatives (especially hydroxyethyl cellulose, hydroxypropyl cellulose, methyl cellulose and carboxymethyl cellulose), water-soluble starch ethers, polyacrylic acid or water-soluble copolymers of acrylic acid with acrylic amide and/or acrylic esters, and poly-N-vinyl derivatives of open-chained or cyclic carboxylic acid amides.

Anionic, cationic or non-ionic surface-active compounds may be used as emulsifiers. Suitable anionic emulsifiers are, for example, alkylsulfonates, alkylarylsulfonates, alkyl sulfates, sulfates of hydroxyalkanols, alkyldisulfonates and alkylaryldisulfonates, sulfonated fatty acids, sulfates and phosphates of alkylpolyethoxyalkanols and alkylarylpolyethoxyalkanols, and sulfosuccinic acid esters. Alkylammonium salts, alkylphosphonium salts and alkylsulfonium salts are examples of suitable cationic emulsifiers. Examples of suitable non-ionic emulsifiers are addition products of ethylene oxide or straight or branched alkanols having 6 to 22 carbon atoms, on alkylphenols, on carboxylic acids, on carboxylic acid amides, or on primary and secondary amides, with from 5 to 50 ethylene oxide units per molecule, and also block copolymers of propylene oxide and ethylene oxide.

It is preferred to use a non-ionic or anionic emulsifier, either alone or in conjunction with a protective colloid, and in an amount of from 1% to 6% by weight, based on the total monomers. The dispersant may be wholly or partially initially present in the polymerization mixture or may be wholly or partially metered in during polymerization.

The polymerization mixture is suitably maintained at a pH within the range of from 2 to 7, preferably from 3 to 5, during polymerization. This may be achieved by the addition of an acid (for example, formic acid, acetic acid, hydrochloric acid or sulfuric acid), a base (for example, ammonia, an amine, sodium hydroxide solution, potassium hydroxide solution or calcium hydroxide), or a buffer salt (for example, an alkali metal acetate, an alkali metal carbonate or an alkali metal phosphate) as appropriate. Polymerization regulators, for example, mercaptans, aldehydes and chlorohydrocarbons, and other polymerization auxiliaries may also be added as desired.

Polymerization may be effected continuously or discontinuously and is suitably carried out at a temperature within the range of from 0° to 100° C, preferably from 20° C to 60° C.

The polymerization may be effected in such a way that the water, the dispersant and a minor part of the monomer mixture are initially present, with the remainder of the monomer mixture being metered in during the course of the polymerization. Alternatively, the entire quantity of monomers may be metered in or the individual monomers may be added in quantity ratios differing from the desired gross composition. If desired, the dispersant may be partially metered in instead of all being added at the beginning. A further alternative is for the monomers, part of the water and part of the dispersant to be pre-emulsified and then to meter in the pre-emulsion so formed.

Polymerization may be continued to a high degree of reaction. A solids content in the dispersion of over 60% by weight may be obtained although advantageously the solids content is from 30% to 60% by weight, preferably from 45% to 55% by weight. The solids content is determined by the water/monomer ratio in the polymerization mixture. The dispersions are generally coagulate-free, but may be finely divided or coarsely divided depending on the particular dispersant used. The particle size of the solids in the dispersion may typically range from 0.05 to 5 $\mu$. The dispersions may be dried to form strong films. The lowest film-forming temperature varies according to the particular polymeric composition but is generally between 0° and 70° C.

Films produced from these dispersions are resistant to hydrolysis, weathering and water absorption. Paints produced from these dispersions generally have a good resistance to wet-rubbing. Moreover, coatings produced from these dispersions have a low surface tackiness and are, therefore, substantially block-free.

The dispersions may be mixed with various auxiliaries according to their intended use, for example, fillers, pigments and plasticizers. The dispersions are particularly suitable for the manufacture of coatings, paints, adhesives, heat-sealable films, and paper-coating compositions, as binders for fibrous materials such as leather and paper, and as additives for hydraulically setting materials such as cement, mortar, tile adhesives and gypsum.

The following examples illustrate the present invention without limitation and compare the properties of films produced from dispersions according to the invention with those of films produced from dispersions not according to the invention. (Parts and percentages are by weight unless stated otherwise.)

EXAMPLES

The following tests were used to characterize the films.

HYDROLYSIS - TEST A

5 × 5 cm pieces of film, which had been dried to constant weight with a film thickness of 0.1 ± 0.02 mm were immersed for 4 days in 25% aqueous sodium hydroxide solution, and then for 4 days in distilled water (which was changed several times), after which they were dried to constant weight. The weight loss was calculated as a percentage of the weight of the film and taken as a measure of the hydrolysis that had occurred. It is evident that, since hydrolysis takes place primarily as a surface attack, the thickness of the film is of considerably importance for the amount of weight loss and must, therefore, be kept constant.

HYDROLYSIS - TEST B

After the addition of twice the amount of water, calculated 1:1 on the polymer, the dispersion was mixed with black iron oxide. Coatings of 0.1 mm dry film thickness were produced from the dispersion on cement asbestos plates. The coated plates were placed in water at 90° C for six hours, after which the appearance of the coating was assessed according to the following scale:
 1 = appearance unaltered
 2 = loss of gloss to slight greying of the coating
 3 = clear greying to isolate formation of holes
 4 = partial peeling or breaking of the coating
 5 = severe peeling of the coating.

WATER ABSORPTION

Pieces of film, as described in Hydrolysis Test A, were placed in water for 24 hours and then the water adhering to the surface was wiped off with chamois. The pieces of film were weighed and the water absorption was calculated as a percentage from the gain in weight.

BLOCKING

The dispersion was coated onto paper to a 200 μ dry film thickness. Two coatings were then placed against one another under a pressure of 2 kg/cm² for 24 hours. The temperature was raised in stages of 10° C and the maximum temperature at which the coatings could still be perfectly separated from one another after cooling was determined.

EXAMPLE 1

400 gm of a nonylphenol polyethylene glycol ether containing 14 ethylene oxide units per molecule and 30 gm of vinyl sulfonate were dissolved in 5.0 kg of water and freed of atmospheric oxygen in a 16-liter stirring autoclave equipped with heating and cooling devices and several means for metering in. 900 gm of a monomer mixture, consisting of 1.8 kg of vinyl acetate, 1.2 kg of methyl methacrylate and 3.0 kg of vinyl chloride, were then added and heated while stirring to 45° C, and ethylene was added to a pressure of 50 atmospheres gauge. Polymerization was then commenced by the simultaneous metering in of a solution of 40 gm of ammonium persulfate in 0.5 kg of water and a solution of 20 gm of sodium formaldehyde sulfoxylate in 0.5 kg of water at respective rates of 40 cm³/h and 80 cm³/h, such that rapid polymerization resulted and was maintained. As soon as a solids content of 10% had been reached, the rest of the monomer mixture was metered in at a rate of 900 gm/h. A solution of 60 gm of acrylamide and 60 gm of acrylic acid in 0.6 kg of water was metered in at a rate of 100 cm³/h.

When the metering in of the monomer mixture had been completed, the addition of ethylene was also stopped. The reaction mixture was kept for a further hour at 45° C, and then the remainder of the catalyst solution was fed in. The mixture was cooled; the excess pressure was released, and the mixture was stirred for a further 2 hours. After brief evacuation, a stable, coagulate-free dispersion was obtained, the solids content and residual monomer content of which were 51% and 0.2%, respectively. Films could be produced from the dispersion at temperatures above 20° C. These films were strong and flexible. They had a polymeric composition of 14% ethylene, 43% vinyl chloride, 26% vinyl acetate, and 17% methyl methacrylate. They had the following properties:
Hydrolysis:
 Test A - 5%
 Test B - 1 to 2
Water absorption - 10%
Block-free up to 60° C.

EXAMPLE 2

(Comparison)

The procedure of Example 1 was followed except that the monomer mixture consisted of 3.0 kg vinyl chloride and 3.0 kg of vinyl acetate. Polymerization took place in a similar manner to and not faster than in Example 1. The dispersion obtained was stable and coagulate-free and had a solids content of 50%, a residual monomer content of 0.7% and a minimum film-forming temperature of 20° C.
Polymeric composition:
 14% ethylene
 43% vinyl chloride
 43% vinyl acetate
Hydrolysis:
 Test A - 12%
 Test B - 4
Water absorption - 29%
Block-free up to 40° C.

It is evident from a comparison of the results of Examples 1 and 2 that the film without methyl methacrylate had a considerably higher water absorption, a poorer resistance to hydrolysis, and a lower freedom from blocking.

EXAMPLE 3

The procedure of Example 1 was followed except that the ethylene pressure was 75 atmospheres gauge and the polymerization temperature was 55° C. A stable dispersion with a residual monomer content of 0.5% and a minimum film-forming temperature of 14° C was obtained.
Polymeric composition:
  17% ethylene
  25% vinyl acetate
  42% vinyl chloride
  16% methyl methacrylate
Hydrolysis:
  Test A - 3%
  Test B - 1
Water absorption - 25%
Block-free up to 40° C.

EXAMPLE 4

The procedure of Example 1 was followed except that additionally 30 gm of sodium dodecylbenzene sulfonate were added to the initial aqueous mixture and that the monomeric mixture consisted of 2.4 kg of vinyl chloride, 2.4 kg of vinyl acetate, and 1.2 kg of butyl methacrylate. A stable dispersion with a 50% solids content was obtained which formed a film even at 0° C.
Polymeric composition:
  12% ethylene
  35% vinyl acetate
  35% vinyl chloride
  18% butyl methacrylate
Hydrolysis:
  Test A - 8%
  Test B - 2
Water absorption - 30%

EXAMPLE 5

3.4 kg of water, 2.3 kg of a 3.5% solution of hydroxyethyl cellulose, 0.15 kg of nonylphenol polyethylene oxide ether having 25 ethylene oxide units per molecule, 0.05 kg of octylphenol polyethylene oxide ether with 8 ethylene oxide units per molecule, and 0.05 kg of sodium dodecylbenzene sulfonate were placed in the autoclave described in Example 1 and freed of atmospheric oxygen. Then 1.2 kg of a monomer mixture, consisting of 3.6 kg of vinyl chloride, 1.2 kg of vinyl acetate and 1.2 kg of methyl methacrylate, were added, the whole was heated to 45° C and ethylene was added to a pressure of 35 atmospheres gauge.

Polymerization was started by beginning to meter in simultaneously a solution of 20 gm of sodium formaldehyde sulfoxylate in 0.5 kg of water and a solution of 40 gm of ammonium persulfate in 0.5 kg of water, at a rate of 100 cm³/h for the first hour and then 50 cm³/h. After the polymerization had started, the rest of the monomer mixture was metered in at a rate of 0.9 kg/h. 30 Minutes after completing the addition of the monomer mixture, the addition of ethylene was also stopped and polymerization was continued for a further hour. Then the rest of the catalyst solution was added. The mixture was cooled to 20° C. The pressure was released and the dispersion was freed from foam by the careful application of a vacuum. A stable, coagulate-free dispersion, having a solids content of 50%, was obtained. The dispersion produced nontacky and strong films.
Polymeric composition:
  8% ethylene
  19% vinyl acetate
  54% vinyl chloride
  19% methyl methacrylate
Film-forming temperature: 45° C
Hydrolysis:
  Test A - 5%
  Test B - 1
Water absorption - 2%
Block-free up to >100° C

EXAMPLE 6

(Comparison)

The procedure of Example 5 was repeated, with the exception that the monomer mixture consisted of 4.8 kg of vinyl chloride and 1.2 kg of vinyl acetate. A stable, coagulate free dispersion was obtained.
Polymeric composition:
  9% ethylene
  18% vinyl acetate
  73% vinyl chloride
Film-forming temperature - 42° C
Hydrolysis:
  Test A - 11%
  Test B - 3
Water absorption - 12%
Block-free up to 60° C.

It is evident that, in spite of the high vinyl chloride content of this film, the hydrolysis loss and the water absorption are considerably greater than with the film produced according to Example 5. The degree of freedom from blocking is also decisively lower.

EXAMPLE 7

4.0 kg of water, 1.7 kg of aqueous 3.5% hydroxyethyl cellulose solution, 0.3 kg of a 30% aqueous solution of a sodium n-aklyl $C_{12}$ -$C_{14}$ ether sulfate with 3 ethylene oxide units per molecule, 30 gm of sodium vinyl sulfonate and 0.1 gm of iron ammonium sulfate were introduced into the autoclave and freed from atmospheric oxygen. Then 1.2 kg of a monomer mixture, consisting of 3.6 kg of vinyl chloride, 0.6 kg of methyl methacrylate and 1.8 kg of vinyl acetate, and 30 gm of a 0.1% palladium sol were added and heated to 60° C while stirring. Ethylene is introduced to a pressure of 35 atmospheres gauge and, in addition, two atmospheres of hydrogen were introduced. Polymerization was started by commencing the metering in of a solution of 20 gm of ammonium persulfate in 0.6 kg of water. The rest of the monomeric mixture was fed in, 30 minutes after polymerization started, at a rate of 1.0 kg/h. When the metering in of the monomer mixture had been completed, polymerization was continued for a further hour with a further addition of catalyst. A stable, coagulate-free dispersion with a solids content of 51% was obtained. It formed a glossy, transparent, non-tacky polymer film.
Polymer composition:
  10% ethylene
  27% vinyl acetate
  54% vinyl chloride
  9% methyl methacrylate
Film-forming temperature - 40° C Hydrolysis:
 Test A - 7%
 Test B - 1
Water absorption - 3%
Block-free up to 80° C.

EXAMPLE 8

(Comparison)

The procedure of Example 5 was followed except that the monomer mixture consisted of 5.4 kg of vinyl acetate and 0.1 kg of methyl methacrylate. Polymerization was initially very slow and irregular. Only after the whole monomer mixture had been metered in did it become vigorous. After the repeated addition of 200 cm$^3$ of catalyst solution in each case and a further three hours of polymerization, a stable, coagulate-free, 50% dispersion with a residual monomeric content of 1% was obtained. This dispersion dried to form a glossy film, the surface of which was tacky.

Polymeric composition:
 14% ethylene
 78% vinyl acetate
 8% methyl methacrylate
Film-forming temperature - 0° C
Hydrolysis:
 Test A - 35%
 Test B - 5
Water absorption - 140%
Block-free up to 10° C.

This example shows that the omission of vinyl chloride results in films with a very low resistance to hydrolysis and high water absorption.

EXAMPLE 9

(Comparison)

A dispersion was prepared, according to Example 1 of German Offenlegungschrift No. 2,153,491, at an ethylene pressure of 70 atmospheres gauge. Polmerization was irregular. In spite of the repeated addition of catalyst, a residual monomer content of 2.5% remained after eight hours of polymerization.

Polymeric composition:
 10% ethylene
 75% vinyl acetate
 15% methyl methacrylate
Film-forming temperature - 5° C
Hydrolysis:
 Test A - 18%
 Test B - 5
Water absorption -96%
Block-free up to 20° C According to this example also, dispersions are obtained which produce films having a high hydrolysis loss and high water absorption.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A hydrolysis-resistant film having a hydrolysis resistance measured in a 5 × 5 cm film having a thickness of 0.1 ± 0.02 mm, such that after maintaining for four days in a 25% aqueous sodium hydroxide solution, the weight loss of said film is less than 10%, consisting essentially of a dried film of an emulsion polymerized copolymer of a mixture of
   (a) from 5% to 50% by weight of ethylene units,
   (b) from 10% to 60% by weight of vinyl acetate,
   (c) from 20% to 70% by weight of vinyl chloride units,
   (d) from 5% to 30% by weight of alkyl methacrylate units having from 1 to 8 carbon atoms in the alkyl moiety,
   (e) from 0 to 5% by weight of olefinically unsaturated monomer units copolymerizable with components (a) to (e) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinylsulfonic acid, vinylpyrrolidone and N-vinylmethyl-acetamide, and
   (f) from 0 to 2% by weight of poly-olefinically-unsaturated monomer units copolymerizable with components (a) to (e).

2. The film of claim 1 wherein said mixture contains from 0.5% to 5% by weight of said component (e).

3. The film of claim 1 wherein said mixture contains from 8% to 20% by weight of component (a), 15% to 40% by weight of component (b), 25% to 60% by weight of component (c), and 8% to 20% by weight of component (d).

4. A film of claim 1 wherein said component (d) is methyl methacrylate.

5. A film-forming aqueous dispersion containing from 40% to 70% by weight of water and a dispersed copolymer consisting essentially of
   (a) from 5% to 50% by weight of ethylene units,
   (b) from 10% to 60% by weight of vinyl acetate,
   (c) from 20% to 70% by weight of vinyl chloride units,
   (d) from 5% to 30% by weight of alkyl methacrylate units having from 1 to 8 carbon atoms in the alkyl moiety,
   (e) from 0 to 5% by weight of olefinically-unsaturated monomer units copolymerizable with components (a) to (d) selected from the group consisting of alkenoic acids having from 3 to 8 carbon atoms, amides of said alkenoic acids, N-methylol amides of said alkenoic acids, alkenedioic acids having from 4 to 8 carbon atoms, monoalkyl esters of said alkenedioic acids having from 1 to 8 carbon atoms in the alkyl moiety, water-soluble salts of vinyl sulfonic acid, vinyl pyrrolidone and N-vinyl-methyl-acetamide, and
   (f) from 0 to 2% by weight of poly-olefinically-unsaturated monomer units copolymerizable with components (a) to (e), said dispersion when dried forming a hydrolysis-resistant film having a hydrolysis resistance measured in a 5×5 cm film having a thickness of 0.1 ± 0.02 mm, such that after maintaining for four days in a 25% aqueous sodium hydroxide solution, the weight loss of said film is less than 10%.

6. The aqueous dispersion of claim 5 wherein said copolymer contains from 0.5% to 5% by weight of said component (e).

7. The aqueous dispersion of claim 5 wherein said copolymer contains from 8% to 20% by weight of component (a), 15% to 40% by weight of component (b), 25% to 60% by weight of component (c) and 8% to 20% by weight of component (d).

8. The aqueous dispersion of claim 5 wherein said component (d) is methyl methacrylate.

9. A process for the production of the aqueous dispersion of claim 5 which consists essentially of copolymerizing components (a) to (f) in an aqueous emulsion in the presence of a water-soluble free-radical initiator and in the presence of an emulsifier selected from the group consisting of anionic surface-active compounds, nonionic surface-active compounds, cationic surface-active compounds, protective colloids and mixtures thereof, and recovering said aqueous dispersion.

10. The film of claim 1 wherein said mixture contains from 8% to 20% by weight of component (a), 15% to 40% by weight of vinyl acetate as component (b), 40% to 60% of component (c), and 8% to 20% of methyl methacrylate as component (d).

* * * * *